United States Patent [19]
Gugsch

[11] Patent Number: 5,295,672
[45] Date of Patent: Mar. 22, 1994

[54] HYDRAULIC TWO-CHAMBER ENGINE MOUNT WITH RIGID OSCILLATING DIAPHRAGM AND SEAL THEREFOR

[75] Inventor: Mathias Gugsch, München, Fed. Rep. of Germany

[73] Assignee: Metzeler Gimetall AG, Munich, Fed. Rep. of Germany

[21] Appl. No.: 929,256

[22] Filed: Aug. 13, 1992

[30] Foreign Application Priority Data

Aug. 13, 1991 [DE] Fed. Rep. of Germany ....... 4126769

[51] Int. Cl.$^5$ .................................................. F16F 7/00
[52] U.S. Cl. .............................. 267/141.3; 267/140.11
[58] Field of Search ................. 267/140.11, 140.13, 267/219, 35, 195, 141.3; 180/300, 312; 248/562, 636

[56] References Cited

U.S. PATENT DOCUMENTS

| | | | |
|---|---|---|---|
| 4,159,091 | 6/1979 | Le Salver et al. | 267/140.13 |
| 4,756,513 | 7/1988 | Carlson et al. | 267/140.11 |
| 4,886,251 | 12/1989 | Häussermann | 267/219 |

FOREIGN PATENT DOCUMENTS

| | | |
|---|---|---|
| 0040290 | 11/1981 | European Pat. Off. . |
| 3246587 | 9/1986 | Fed. Rep. of Germany . |
| 3024089 | 11/1986 | Fed. Rep. of Germany . |
| 0120937 | 5/1988 | Japan .................................. 267/219 |
| 2-236036 | 9/1990 | Japan ............................ 267/140.13 |
| 2237354 | 5/1991 | United Kingdom ........... 267/140.13 |

*Primary Examiner*—Andres Kashnikow
*Assistant Examiner*—Chris Schwartz
*Attorney, Agent, or Firm*—Herbert L. Lerner; Laurence A. Greenberg

[57] ABSTRACT

A hydraulically damping two-chamber engine mount includes chambers being bordered with rubber-elastic material and an intermediate plate with an overflow conduit and a central diaphragm. For force-free motion of the diaphragm in the vertical direction, the diaphragm is constructed as a rolling diaphragm, in such a way that a conduit of reduced width at the top and bottom is provided between the diaphragm of rigid material and the intermediate plate surrounding it annularly. In the conduit, on the opposed conduit walls, rolling elements with a circular cross section are inserted for rolling support of the diaphragm.

9 Claims, 2 Drawing Sheets

HYDRAULIC TWO-CHAMBER ENGINE MOUNT WITH RIGID OSCILLATING DIAPHRAGM AND SEAL THEREFOR

The invention relates to a hydraulically damping two-chamber engine mount, including two chambers being rubber-elastically bordered, and a rigid intermediate plate between the chambers having an overflow conduit and a central, rigid diaphragm with a predetermined vertical clearance, for decoupling high-frequency, low-amplitude vibration.

With such a mount, low-frequency vibration, in particular, is intended to be damped, while high-frequency vibration and in particular acoustic vibration is intended to be isolated. Among others, the demands made on such a mount in terms of its damping and isolation properties are that the attained damping action and the attained isolating action can be optimized independently of one another, and that the damping and isolation action depend on the amplitude of the vibration being induced.

In terms of its basic principle, such a requisite action is achieved by the parallel connection of a conduit that is tuned to low frequency, as a connecting opening between the working chamber and the compensating chamber, and by closing the connecting opening which is tuned to high frequency by a diaphragm having a limited clearance or play, so that the exchange of fluid through the connecting opening is limited to a certain volume, which can be as low as zero.

In the prior art, the problem of creating a diaphragm with limited clearance has been solved in various ways, such as those described in Published European Application No. 0040290 B1, German Patent DE 3024089 C2, or German Patent DE 3246587 C2, corresponding to U.S. Pat. No. 4,697,794. Essentially two solutions have developed, which can be summarized as follows. In the first solution, diaphragms are strained for flexion and have a geometry that provides a progressive behavior in terms of their spring characteristic, or are limited in their clearance by stops, such as a diaphragm cage. Such devices also include rigid diaphragm plates that are suspended by a highly flexible joint. With that type of diaphragm, the amplitude separation between high and low-frequency vibration is often inadequate, since at greater amplitudes, or in other words higher differential pressures between the fluid chambers, the flexing of the diaphragm increases as well. Moreover, in clearance limitation, close production tolerances are necessary, which are in the range of tenths of millimeters. Additionally, limiting clearance by means of stops can lead to noise production.

Another option for constructing the diaphragm includes translationally moved diaphragm plates that are fastened free-floatingly between two stops. With such diaphragms the production tolerances are even more critical, because in addition to the clearance tolerance, the diameter tolerance of the diaphragm and of the diaphragm cage must also be adhered to precisely. In addition, a kind of loosening effect can be observed because of friction, and that is a force that must be overcome before the diaphragm can move freely in its cage.

A further translationally movable but rigid diaphragm is known from U.S. Pat. No. 4,756,513. However, in that case the rigid diaphragm is sheathed on the outer periphery by a rubber ring, which is displaceably retained in a corresponding recess of the rigid intermediate plate surrounding the diaphragm. With that kind of diaphragm structure, although rattling noises upon impact at the upper and lower boundary are avoided, nevertheless with suitably tight guidance, considerable frictional forces must be overcome in such a case as well, so that such a diaphragm has inadequate ease of motion.

It is accordingly an object of the invention to provide a hydraulically damping two-chamber engine mount, which overcomes the hereinafore-mentioned disadvantages of the heretofore-known devices of this general type and which creates a diaphragm with limited clearance, which is simple in structure and in which a virtually force-free motion is possible, in other words a motion that can freely follow the induced vibration with only extremely slight external influences.

With the foregoing and other objects in view there is provided, in accordance with the invention, a hydraulically damping two-chamber engine mount, comprising two chambers with rubber-elastically borders or boundaries, a rigid intermediate plate being disposed between the chambers and having an overflow conduit, a central, rigid diaphragm being annularly surrounded by the rigid intermediate plate and having a predetermined vertical clearance or play for decoupling high-frequency, low-amplitude vibration, the rigid diaphragm and the rigid intermediate plate having opposed conduit walls defining an annular conduit between the conduit walls being open toward the chambers and having a top and a bottom with reduced cross sections forming stops for clearance limitation, and at least one element with a circular cross section disposed on at least one of the conduit walls in the annular conduit for rolling support of the rigid diaphragm.

This rolling support of the diaphragm creates free mobility of the diaphragm, subject to only very small frictional forces. The structure itself is quite simple, and the various components may be manufactured by favorable production methods, since the necessary tolerances are within the usual limits.

In accordance with another feature of the invention, the at least one rolling element is an elastic ring that is inserted into the conduit. The diaphragm can then easily roll on the ring and the clearance of the diaphragm is limited by the reduced width of the conduit at the top and bottom.

In accordance with a further feature of the invention, the at least one rolling element is a plurality of elastic ring segments, cylindrical rollers or balls.

In accordance with an added feature of the invention, the the conduit walls are parallel and conically converge at the top and bottom.

In accordance with an additional feature of the invention, the conduit walls converge in curved fashion.

In accordance with yet another feature of the invention, the radius of curvature at the conduit walls is at least twice as great as the radius of the inserted elements.

In accordance with a concomitant feature of the invention, the intermediate plate is horizontally split. This is done in particular to facilitate assembly.

Other features which are considered as characteristic for the invention are set forth in the appended claims.

Although the invention is illustrated and described herein as embodied in a hydraulically damping two-chamber engine mount, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
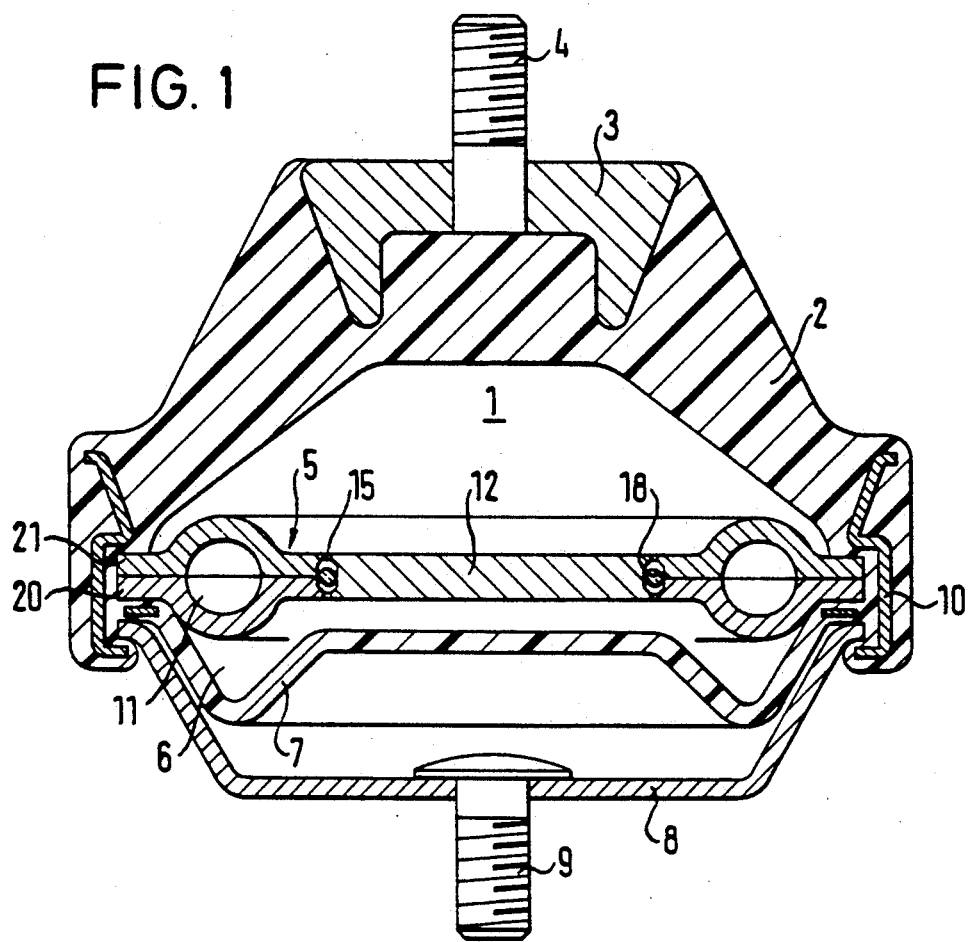
FIG. 1 is a diagrammatic, longitudinal-sectional view of an engine mount with a rolling diaphragm.

Referring now to the figures of the drawing in detail and first, particularly, to FIG. 1 thereof, there is seen a longitudinal section through a two-chamber engine mount, in which a working chamber 1 is bordered or bounded in the conventional manner by a frustoconical support spring 2. The top of the support spring 2 carries a bearing plate 3 with a bolt 4 for supporting an engine. Below an intermediate plate 5 is a compensating chamber 6, which is defined at the bottom by a flexible wall 7. The support spring 2, the intermediate plate 5 and the flexible wall 7, together with a lower, cup-shaped closure plate 8, which is fixed to a vehicle body by a bolt 9, are held together by an annular flange 10 serving as an outer wall.

An outer peripheral region of the intermediate plate 5 has an overflow conduit 11, which forms a connection between the working chamber 1 and the compensating chamber 6 through non-illustrated overflow openings and which is tuned for damping low-frequency vibrations of high amplitude.

Figure 2:
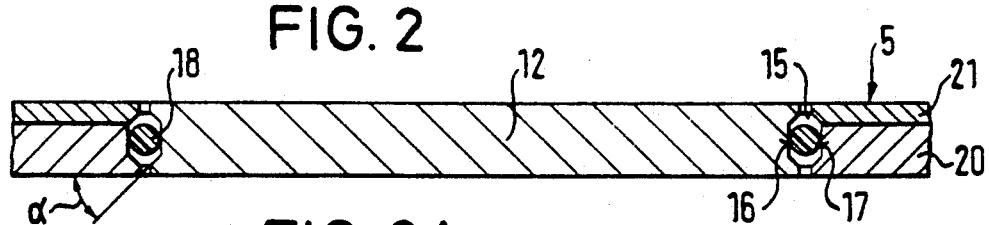
FIG. 2 is an enlarged, fragmentary, longitudinal-sectional view of an intermediate plate with the rolling diaphragm.

A rolling diaphragm 12 is also supported centrally in the intermediate plate 5. The structure and disposition of the rolling diaphragm 12 are visible in detail and on a larger scale in FIG. 2.

A conduit 15 is left open between the rigid diaphragm 12 and the intermediate plate 5. The conduit 15 has conduit walls 16 and 17 that extend parallel to one another in a middle region and narrow conically by a given angle alpha at upper and lower ends. An elastic ring 18 which is inserted into this conduit 15 has a diameter which corresponds to the width of the conduit 15, or it may be constructed in such a way as to be slightly larger.

Figure 2A:
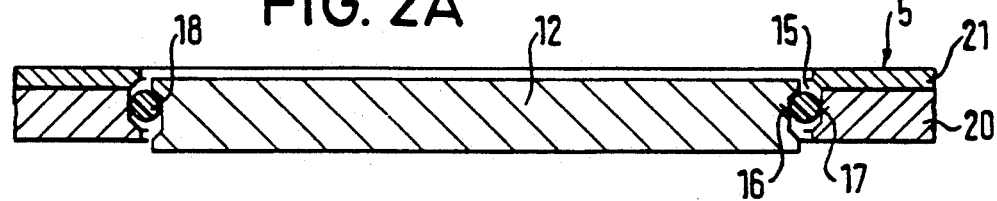
FIG. 2A is a view similar to FIG. 2 showing the rolling diaphragm in a lower terminal position.

When vibration is induced, the diaphragm plate 12 can be deflected freely up and down and the ring 18 rolls upward or downward along the conduit walls 16 and 17, so that the approximate result may be a lower terminal position of the diaphragm 12 as shown in FIG. 2a.

As can be seen from the drawing, the rolling path, that is the conduit walls 16 and 17, is constructed in terms of geometry in such a way that the rolling travel and therefore the clearance of the diaphragm 12 is limited. The ring 18 therefore takes on a rolling function and it seals off the diaphragm 12 from the intermediate plate 5, it can compensate for production tolerances and it assures a softer impact of the diaphragm 12 in its terminal positions.

It is also practical to split the intermediate plate 5 in two so that it includes a lower ring part 20 and an upper ring part 21. This horizontal split need not necessarily be in the center, as can be seen from FIG. 2. This split also substantially facilitates assembly, because the ring 18 is first slipped onto the diaphragm 12, and subsequently the parts 20 and 21 of the intermediate plate 5 are mounted on the outsides.

Figure 3:
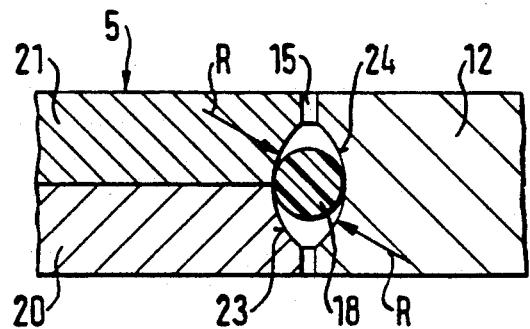
FIG. 3 is a further enlarged, fragmentary, longitudinal-sectional view of a special embodiment of a rolling conduit.

Another optional embodiment of the conduit 15 is shown in FIG. 3. In this case, conduit walls 23 and 24 are constructed in such a way as to be curved relative to one another, suitably with a radius R, which is at least twice as great as the radius of the ring 18. Through the use of such a structure, the rolling behavior of the ring 18 and the impact behavior of the diaphragm 12 can be even further varied.

The result of using the embodiment described above is accordingly a two-chamber engine mount having a diaphragm for isolating high-frequency, low-amplitude vibrations. The diaphragm can follow the induced vibration virtually without force and thus effects optimal damping.

Figure 4A:
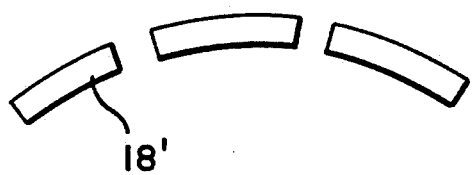
FIGS. 4A, 4B and 4C are top-plan views of ring segments, a cylinder and a ball which may replace the ring shown in the other figures.
Figure 4B:
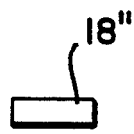
Figure 4C:
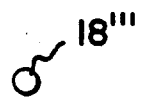

FIG. 4A shows elastic ring segments 18' which may be used instead of the ring 18. Similarly, cylindrical rollers 18" some of which are shown in FIG. 4B or balls 18''' one of which is shown in FIG. 4C, may be substituted for the ring 18.

I claim:

1. A hydraulically damping two-chamber engine mount, comprising two chambers with rubber-elastic borders, a rigid intermediate plate disposed between said chambers and having an overflow conduit, a central, rigid diaphragm being annularly surrounded by said rigid intermediate plate and having a predetermined vertical clearance for decoupling high-frequency, low-amplitude vibration, said rigid diaphragm and said rigid intermediate plate having opposed conduit walls defining an annular conduit between said conduit walls at a location radially between said rigid diaphragm and said intermediate plate, said annular conduit being open toward said chambers and having a top and a bottom with reduced cross sections forming stops for clearance limitation, and at least one element with a circular cross section disposed on at least one of said conduit walls in said annular conduit on which said rigid diaphragm rolls and translates vertically.

2. The two-chamber engine mount according to claim 1, wherein said at least one rolling element is an elastic ring.

3. The two-chamber engine mount according to claim 1, wherein said at least one element is a plurality of elastic ring segments.

4. The two-chamber engine mount according to claim 1, wherein said at least one element is a plurality of cylindrical rollers.

5. The two-chamber engine mount according to claim 1, wherein said at least one element is a plurality of balls.

6. The two-chamber engine mount according to claim 1, wherein said conduit walls are parallel and conically converge at the top and bottom.

7. The two-chamber engine mount according to claim 1, wherein said conduit walls converge in curved fashion.

8. The two-chamber engine mount according to claim 7, wherein said at least one element has a given radius, and said conduit walls have a radius of curvature being at least twice as great as said given radius.

9. The two-chamber engine mount according to claim 1, wherein said intermediate plate is horizontally split.

* * * * *